(12) United States Patent
Kesse et al.

(10) Patent No.: US 8,413,424 B2
(45) Date of Patent: Apr. 9, 2013

(54) STORED REDUCTANT STATE FOR STARTUP

(75) Inventors: Mary Lou Kesse, Peoria, IL (US);
Christopher L. Wynkoop, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 849 days.

(21) Appl. No.: 12/358,297

(22) Filed: Jan. 23, 2009

(65) Prior Publication Data
US 2010/0186383 A1   Jul. 29, 2010

(51) Int. Cl.
*F01N 3/00* (2006.01)
(52) U.S. Cl. ............... 60/286; 60/274; 60/295; 60/301; 60/303
(58) Field of Classification Search .............. 60/274, 60/276, 277, 286, 295, 301, 303
See application file for complete search history.

(56) References Cited

U.S. PATENT DOCUMENTS

| | | | |
|---|---|---|---|
| 5,628,186 A | 5/1997 | Schmelz | |
| 6,082,102 A | 7/2000 | Wissler et al. | |
| 6,119,448 A | 9/2000 | Emmerling et al. | |
| 6,305,160 B1 * | 10/2001 | Hammerle et al. | 60/274 |
| 7,150,145 B2 | 12/2006 | Patchett et al. | |
| 7,178,328 B2 | 2/2007 | Solbrig | |
| 7,200,990 B2 | 4/2007 | Gabrielsson et al. | |
| 7,418,816 B2 | 9/2008 | Upadhyay et al. | |
| 7,426,825 B2 | 9/2008 | Viola et al. | |
| 7,559,194 B2 * | 7/2009 | Westerberg | 60/286 |
| 2004/0040287 A1 | 3/2004 | Beutel et al. | |
| 2005/0005596 A1 | 1/2005 | Xu et al. | |
| 2005/0086933 A1 | 4/2005 | Nieuwstadt et al. | |
| 2006/0130461 A1 | 6/2006 | Gabrielsson et al. | |
| 2007/0128088 A1 | 6/2007 | Willey et al. | |
| 2007/0277505 A1 | 12/2007 | Dawson et al. | |
| 2008/0202097 A1 | 8/2008 | Driscoll et al. | |

* cited by examiner

*Primary Examiner* — Thomas Denion
*Assistant Examiner* — Diem Tran
(74) *Attorney, Agent, or Firm* — Jeff A. Ruppel

(57) ABSTRACT

An engine exhaust aftertreatment system including an catalyst-based device configured to reduce an amount of NOx in exhaust gases produced by an engine using reductant stored in the catalyst-based device. The system includes a controller configured to determine a starting quantity of stored reductant in the catalyst-based device at the start of the engine. The starting quantity is based on a shutdown quantity of stored reductant in the catalyst-based device determined at the shutdown of the engine.

17 Claims, 2 Drawing Sheets

STORED REDUCTANT STATE FOR STARTUP

TECHNICAL FIELD

The present disclosure relates to engine exhaust treatment systems, and more particularly to controlling the introduction of a reductant into engine exhaust treatment systems.

BACKGROUND

Selective Catalytic Reduction (SCR) systems may be included in an exhaust treatment or aftertreatment system for a power system to remove or reduce nitrous oxide (NOx or NO) emissions coming from the exhaust of an engine. The SCR systems include a catalyst and the introduction of a reductant to the exhaust stream upstream of the catalyst. A common reductant used is urea, which is broken down into a redutent product such as ammonia (NH3) that is adsorbed or stored in (or on) the catalyst. The reductant and reductant product may be commonly referred to as the "reductant." The ammonia product reacts with NOx in the exhaust to convert the NOx to Nitrogen (N2) and water (H2O).

Controllers monitor engine and aftertreatment component parameters to determine the amount of reductant to be added. However, situations may arise where excess reductant is introduced and not all the reductant is stored, resulting in reductant "slip." Reductant "slip" involves the redcuant exiting the SCR and being released to the environment.

U.S. Patent Publication No. 2008/0202097 (the '097 publn) describes a system for introducing reductant to an exhaust stream. The '097 publn discloses the monitoring of SCR temperature and the use of a controller to control the injection of reductant.

SUMMARY

In one aspect, the present disclosure provides an engine exhaust aftertreatment system including a catalyst-based device including a catalyst configured to reduce an amount of NOx in exhaust gases produced by an engine. The catalyst reduces the NOx using reductant stored in the catalyst-based device. In another aspect, the system includes a controller configured to determine a starting quantity of stored reductant in the catalyst-based device at the start of the engine. The starting quantity is based on a shutdown quantity of stored reductant in the catalyst-based device determined at the shutdown of the engine.

In yet another aspect, the present disclosure provides a method of controlling a reductant injection into a catalyst-based device. The method includes determining a shutdown quantity of stored reductant in the catalyst-based device and deriving a starting quantity of stored reductant at the start of the engine based on the shutdown quantity.

Other features and aspects of this disclosure will be apparent from the following description and the accompanying drawings.

DETAILED DESCRIPTION

Figure 1:
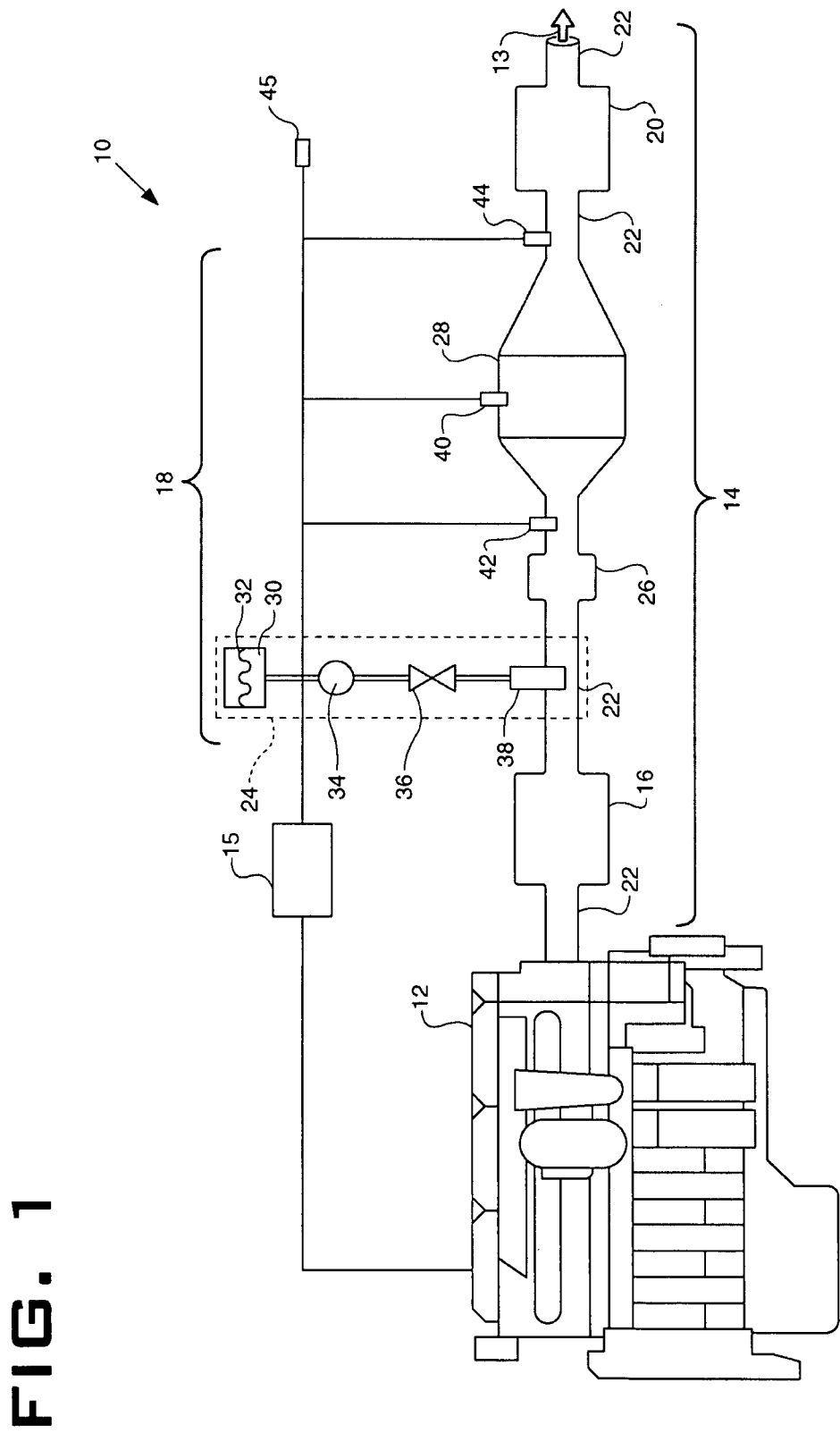
FIG. 1 is a diagrammatic view of a power system including an engine and an aftertreatment system.

As seen in FIG. 1, a power system 10 includes an engine 12 and an aftertreatment system 14 to treat an exhaust stream 13 produced by the engine 12. The engine 12 may include other features not shown, such as fuel systems, air systems, cooling systems, peripheries, drivetrain components, turbochargers, etc. The engine 12 may be any type of engine (internal combustion, gas, diesel, gaseous fuel, natural gas, propane, etc.), may be of any size, with any number of cylinders, and in any configuration ("V," in-line, radial, etc.). The engine 12 may be used to power any machine or other device, including on-highway trucks or vehicles, off-highway trucks or machines, earth moving equipment, generators, aerospace applications, locomotive applications, marine applications, pumps, stationary equipment, or other engine powered applications.

The aftretreatment system 14 includes a controller 15, pre-SCR components 16, a Selective Catalytic Reduction (SCR) system 18, post-SCR components 20, and an exhaust pipe 22. The exhaust stream 13 exits the engine 12, passes through the pre-SCR components 16, then passes through the SCR system 18, and then passes through the post-SCR components 20 via the exhaust pipe 22. The pre-SCR and post-SCR components 16 and 20 may include devices such as regeneration devices, heat sources, oxidation catalysts, diesel oxidation catalysts (DOCs), diesel particulate filters (DPFs), additional SCR systems, lean NOx traps (LNTs), mufflers, or other devices needed to treat the exhaust stream 13 before and after the SCR system 18 and before exiting the power system 10.

The SCR system 18 may include a reductant system 24, mixer 26, and a SCR 28. The SCR 28 may be a catalyst-based device including a catalyst configured to reduce an amount of NOx in the exhaust stream by using a reductant 30 adsorbed or stored in the catalyst-based device. The reductant system 24 introduces or supplies the reductant 30 into the exhaust stream 13.

The mixer 26 may be added to aid mixing of the reductant 30 with the exhaust stream 13. The reductant 30 may be urea, ammonia, diesel fuel, or other hydrocarbon used by the SCR 28 to reduce or otherwise remove NOx or NO emissions from the exhaust stream 13.

The reductant system 24 is shown to include a reductant source 32, pump 34, valve 36, and injector 38. The reductant source 32 may be a tank, vessel, absorbing material, or other device capable of storing and releasing the reductant 30. If the reductant 30 used is the same as the fuel used to power the engine 12, then the reductant 30 may be the engine's 12 fuel tank. The reductant 30 also includes reductant product that may be produced in the SCR 28 (ie. reductant 30 would include both urea and ammonia).

The pump 34 is an extraction device capable of pulling the reductant 30 from the reductant source 32. The valve 36 may be included to help regulate or control the delivery of the reductant 30. The injector 38 creates a reductant spray or otherwise introduces the reductant 30 into the exhaust stream 13 or SCR 28.

The controller 15 is electronically connected to the engine 12, reductant system 24, a SCR temperature sensor 40, an inlet NOx sensor 42, an outlet NOx sensor 44, and an ambient temperature sensor 45. The inlet NOx sensor 42 measures and communicates an indication of the amount of NOx entering the SCR 28 and may be located upstream of the SCR 28. The inlet NOx sensor 42 may be a "virtual sensor," with the amount of NOx derived by monitoring one or more engine 12 and/or exhaust stream 13 operating parameters.

The outlet NOx sensor 44 measures and communicates an indication of the NOx amount exiting the SCR 28 and may be located downstream of the SCR 28. A comparison of NOx amount entering and exiting the SCR 28 may be used to derive an amount of reductant 30 present in the SCR 28. The outlet NOx sensor 44 may also be capable of measuring and communicating a direct indication of reductant 30 amount in the SCR 28. The amount of NOx and reductant 30 may also be reflected as a concentration.

The SCR temperature sensor 40 is positioned at a location suitable to detect a temperature associated with the SCR 28. As shown, the SCR temperature sensor 40 is positioned in the SCR 28. Alternatively, SCR temperature sensor 40 may be located along exhaust pipe 22 somewhat upstream or downstream from SCR 28, such that the temperature of SCR 28 may be predicted. In other embodiments, SCR temperature sensor 40 may a "virtual sensor," with temperatures derived by monitoring one or more engine 12 and/or exhaust stream 13 operating parameters and predicting the SCR 28 temperature.

The controller 15 receives SCR temperature sensor 40, inlet NOx sensor 42, outlet NOx sensor 44, ambient temperature sensor 45, engine 12, and/or machine operating related information. The controller 15 may include components such as, for example, a memory, one or more data storage devices, a central processing unit, or any other components that may be used to run an application. Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Various other known circuits may be associated with controller 15, such as power supply circuitry, signal-conditioning circuitry, solenoid driver circuitry, communication circuitry, and other appropriate circuitry.

The controller 15 may also be configured to perform processing and controlling functions, such as, for example, engine management (e.g., controller 15 may include an engine control module, a.k.a. an ECM), monitoring/calculating various parameters related to exhaust output and aftertreatment thereof, etc. In some embodiments, the engine 12 may include multiple controllers, each dedicated to perform one or more of these or other functions. Such multiple controllers 15 may be configured to communicate with one another.

Industrial Applicability

The controller 15 may process information from the SCR temperature sensor 40, inlet NOx sensor 42, outlet NOx sensor 44, ambient temperature sensor 45, engine 12, and/or machine to control the injection of reductant 30. The controller 15 derives a capacity or amount of reductant 30 that can be stored in and used by the SCR 28 based on characteristics of the SCR 28 and known capacities. The amount of reductant 30 that can be stored in and used by the SCR 28 catalyst may also depend on the temperature of the SCR 28 catalyst. Therefore the controller 15 may use temperature readings from the SCR temperature sensor 40.

The controller 15 may also receive readings from the inlet NOx sensor 42 to indicate the amount of NOx entering the SCR 28 and derive an amount of reductant that the SCR 28 will consume. The outlet NOx sensor may communicate whether excessive NOx is making it past the SCR 28 (indicating more reductant 30 is needed) or whether reductant 30 or reductant product is exiting the SCR 28 (indicating too much reductant 30 has been added).

Figure 2:
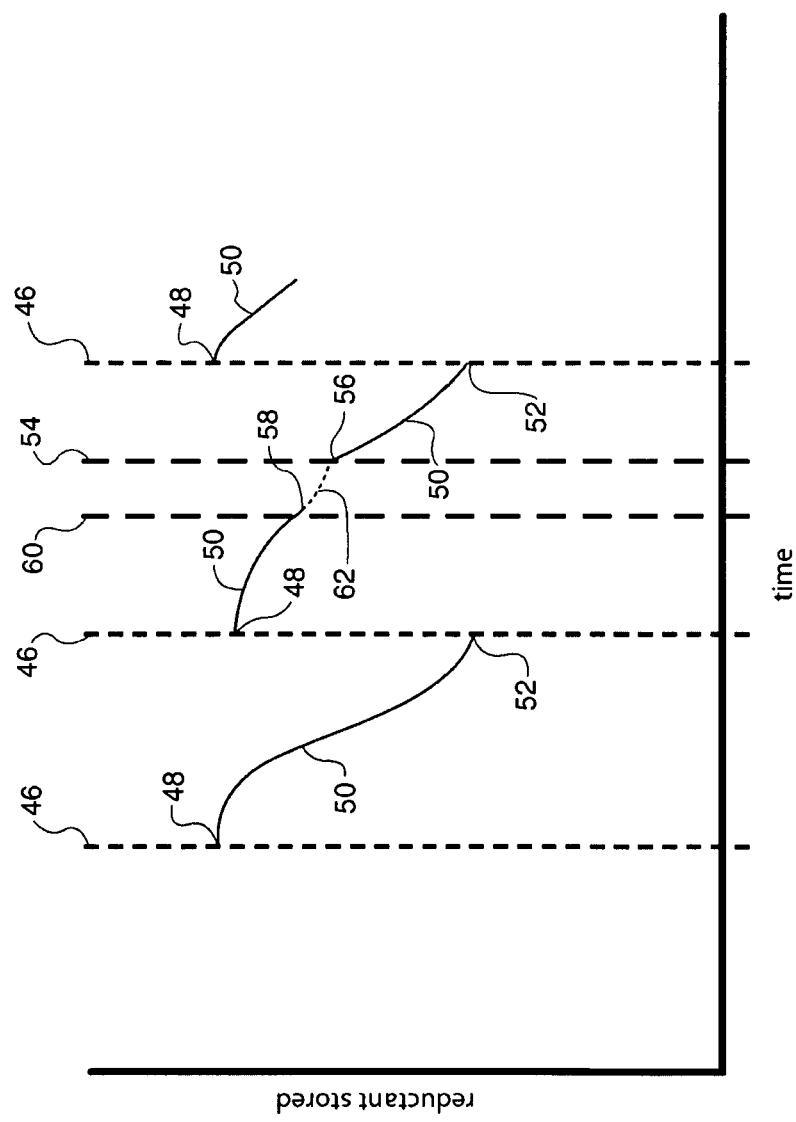
FIG. 2 is an exemplary graphical representation of the quantity of reductant stored in an SCR as a function of time during periods of engine startup, operation, and shutdown.

FIG. 2 illustrates the amount of reductant 30 stored in the SCR 28 as a function of time. The lines shown in FIG. 2 are meant for illustrative purposes and may or may not reflect as seen levels, rates, or times.

The controller 15 may periodically order a reductant injection 46, thereby loading the SCR 28 to a full quantity 48 of reductant 30. As the machine or engine 12 run, NOx is produced and consumed in the SCR 28. This consumption by the SCR 28, along with natural decay, deplinishes the amount of reductant 30 stored in the SCR 28 as reflected by a reductant consumption curve 50.

Once a given amount of reductant 30 has been consumed and a low quantity 52 level is reached on the reductant consumption curve 50, another reductant injection 46 is ordered to again achieve a full quantity 48. The time required to achieve a full quantity 48 is shown as being instantaneous but may require a length of time.

At engine startup 54 the controller must assign a starting quantity 56 of reductant 30 in the SCR 28. If the controller 15 assigned a full quantity 48 at engine startup 54 no reductant injection 46 would be ordered by the controller 15. Assuming the SCR 28 has the full quantity 48 when it does not may result insufficient reductant 30 being injected and a failure to convert NOx.

If the controller 15 assigned a low quantity 52 at engine startup 54 then a reductant injection 46 would be ordered by the controller 15. Assuming the SCR 28 has a level of reductant 30 stored above the low quantity 52, the reductant injection 46 may result in a "slip" of reductant 30 exiting the SCR 28.

Similarly, the assumption of any significantly incorrect amount of stored reductant 30 at engine startup 54 may result in the initial non-conversion of NOx or reductant 30 slip. This reductant 30 slip may especially occur at engine startup 54 or before the controller 15 communicates with the outlet NOx sensor 44 and derives and effectuates a corrected timing of the reductant injection 46.

In order to avoid the reductant 30 slip at engine startup 54, controller 15 predicts or derives the starting quantity 56. The starting quantity 56 may be a substantially correct amount of stored reductant 30 at engine startup 54. The controller 15 stores in memory a shutdown quantity 58 of reductant 30 stored in the SCR 28 at the time of an engine shutdown 60.

The controller 15 next calculates or derives a shutdown extrapolation 62 of decaying quantity of stored reductant 30 as a function of time. The shutdown extrapolation 62 may be a function of characteristics of the SCR 28 and the temperature of the SCR 28. The shutdown extrapolation 62 may also be a function of ambient temperatures measured by the ambient temperature sensor 45. Changes to the temperature of the SCR 28 can accordingly be predicted during periods of engine shutdown when the controller 15 receives no signal from the sensors.

The starting quantity 56 is thereby calculated, determined, or derived based on the shutdown quantity 58 stored in memory at engine shutdown 60. At engine startup 54 the controller 15 resumes the reductant consumption curve 50 from the starting quantity 56. As a result, the controller 15 does not order the reductant injection 46 until the low quantity 52 is reached. Accordingly, a significant non-conversion of NOx or reductant 30 slip is avoided.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. An engine exhaust aftertreatment system comprising:
a catalyst-based device including a catalyst configured to reduce an amount of NOx in exhaust gases produced by an engine, by using reductant stored in the catalyst-based device; and
a controller configured to determine a starting quantity of stored reductant in the catalyst-based device at the start of the engine, the starting quantity is based on a shutdown quantity of stored reductant in the catalyst-based device determined at the shutdown of the engine, wherein the controller derives the starting quantity of stored reductant based on time of engine shutdown.

2. The engine exhaust aftertreatment system of claim 1 wherein the controller derives the starting quantity of stored reductant based on temperature of the catalyst-based device.

3. The engine exhaust aftertreatment system of claim 1 wherein the controller stores the shutdown quantity of stored reductant in memory during shutdown of the engine.

4. The engine exhaust aftertreatment system of claim 1 wherein the controller is configured to order a reductant injection once a predetermined low quantity of reductant is determined.

5. The engine exhaust aftertreatment system of claim 4 wherein the controller determines the low quantity of reductant has been reached based on:
time;
temperature of the catalyst-based device; and
concentration of NOx entering the catalyst-based device.

6. The engine exhaust aftertreatment system of claim 4 wherein the controller determines the low quantity of reductant has been reached based on a concentration of NOx exiting the catalyst-based device.

7. An engine exhaust aftertreatment system comprising:
a catalyst-based device including a catalyst configured to reduce an amount of NOx in exhaust gases produced by an engine, by using reductant stored in the catalyst-based device; and
a controller, configured to derive a starting quantity of stored reductant at the start of the engine, wherein the starting quantity is derived based on time of engine shutdown.

8. The engine exhaust aftertreatment system of claim 7 wherein the starting quantity is derived based on a shutdown quantity of stored reductant in the catalyst-based device determined at the shutdown of the engine.

9. The engine exhaust aftertreatment system of claim 7 wherein the starting quantity is derived based on temperature of the catalyst-based device.

10. The engine exhaust aftertreatment system of claim 7 wherein the controller stores the shutdown quantity of stored reductant in memory during shutdown of the engine.

11. The engine exhaust aftertreatment system of claim 7 wherein the controller is configured to order a reductant injection once a predetermined low quantity of reductant is determined.

12. The engine exhaust aftertreatment system of claim 11 wherein the controller determines the low quantity of reductant has been reached based on:
time;
temperature of the catalyst-based device; and
concentration of NOx entering the catalyst-based device.

13. The engine exhaust aftertreatment system of claim 11 wherein the controller determines the low quantity of reductant has been reached based on a concentration of NOx exiting the catalyst-based device.

14. A method of controlling a reductant injection into a catalyst-based device comprising:
determining a shutdown quantity of stored reductant in the catalyst-based device;
and deriving a starting quantity of stored reductant at the start of the engine based on the shutdown quantity, wherein the starting quantity is derived based on time of engine shutdown and temperature of the catalyst-based device.

15. The method of claim 14 further including storing the shutdown quantity of stored reductant in memory during shutdown of the engine.

16. The method of claim 14 further including ordering a reductant injection once a predetermined low quantity of reductant is determined.

17. The method of claim 16 further including determining wherein the low quantity of reductant has been reached based on:
time;
temperature of the catalyst-based device; and
concentration of NOx entering the catalyst-based device.

* * * * *